United States Patent [19]
Brede et al.

[11] Patent Number: 5,294,414
[45] Date of Patent: Mar. 15, 1994

[54] GAS GENERATOR, IN PARTICULAR, A TUBULAR GAS GENERATOR FOR AN AIR BAG

[75] Inventors: Uwe Brede, Fürth; Josef Kraft, Berg; Gerrit Scheiderer, Fürth, all of Fed. Rep. of Germany

[73] Assignee: Dynamit Nobel Aktiengesellschaft, Troisdorf, Fed. Rep. of Germany

[21] Appl. No.: 800,005

[22] Filed: Nov. 29, 1991

[30] Foreign Application Priority Data

Nov. 28, 1990 [DE] Fed. Rep. of Germany ....... 4037767

[51] Int. Cl.⁵ ............................................. B01J 7/00
[52] U.S. Cl. .................................. 422/305; 422/165; 422/166; 280/732; 280/736; 280/740; 280/742; 102/530; 102/531
[58] Field of Search ................. 422/165, 166, 305; 280/728, 732, 736, 740, 741, 742; 102/530, 531

[56] References Cited

U.S. PATENT DOCUMENTS

| | | | |
|---|---|---|---|
| 3,413,013 | 11/1968 | Wissing et al. | 280/740 |
| 3,441,290 | 4/1969 | Berryman | 280/737 |
| 4,878,690 | 11/1989 | Cunningham | 280/736 |
| 4,919,897 | 4/1990 | Bender et al. | 280/736 |
| 4,938,501 | 7/1990 | Wipasuramonton | 280/741 |
| 5,000,479 | 3/1991 | Werner et al. | 280/741 |
| 5,028,070 | 7/1991 | Bender | 280/741 |

FOREIGN PATENT DOCUMENTS

| | | |
|---|---|---|
| 0316119 | 5/1989 | European Pat. Off. . |
| 3832120 | 3/1990 | Fed. Rep. of Germany . |
| 3909841 | 9/1990 | Fed. Rep. of Germany . |

Primary Examiner—Robert J. Warden
Assistant Examiner—Laura E. Collins
Attorney, Agent, or Firm—Antonelli, Terry, Stout & Kraus

[57] ABSTRACT

The gas generator has two tubes, coaxial to each other, with different diameters, between which there is formed an annular intermediate chamber. The inner tube is filled with gas-producing material in the form of pellets, which develops pressure gas when ignited, the gas emerges via openings in both tubes. Projecting into the inner tube there is an ignition device, which extends through the cylindrical walls of both tubes. The ignition device is held by a ring or tubular holding body, which is substantially shorter than both tubes and fills out the intermediate chamber between both tubes. Both tubes are provided with peripheral openings aligning with each other, and the holding body has an installation through-hole, into which the ignition device is positioned. The holding body has furthermore a slot. The ignition device is held in a reliable manner by means of the holding body.

12 Claims, 2 Drawing Sheets

GAS GENERATOR, IN PARTICULAR, A TUBULAR GAS GENERATOR FOR AN AIR BAG

BACKGROUND OF THE INVENTION

This invention relates to a gas generator, in particular a tubular generator for an air bag, with an outer tube and an inner tube and for accepting a gas-producing material, wherein the inner tube, forming an annular intermediate chamber, is arranged radially spaced from the outer tube; with closure covers for closing open front ends of both tubes and with an ignition device, extending up to the interior of the inner tube, for igniting the gas-producing material; the ignition device being arranged centrally of the tubes.

A similar tubular gas generator is known from DE-39 14 690 C2. The known gas generator has an outer tube, in the wall (jacket) of which there are arranged gas outlet openings and the front ends of which are closed by disc-like closure covers inserted into the outer tube. Arranged coaxially to the outer tube and in this tube there is an inner tube, also provided with gas outlet openings in its jacket, the outer diameter of which is smaller than the inner diameter of the outer tube, so that there is a radial spacing between both tubes. In the annular intermediate chamber there is arranged a filter material. The inner tube, the axial length of which is less than that of the outer tube, is filled up with (pressure) gas-producing material (in the following description, this material is also called pressure gas-generating charge, for example in the form of pellets), which is ignited by an ignition unit. The gas formed upon ignition of the gas-producing material passes via the gas outlet openings of the inner tube through the filter material, in order to emerge outside via the gas outlet openings in the outer tube. The gas generator is arranged in a housing which is open on one side, when it is used for an air bag, said opening being closed by a folded fabric, the actual inflatable air bag. In this known tubular gas generator the ignition unit is arranged at one end of the gas generator in the closure cover. This "one-sided" arrangement of the ignition unit is disadvantageous with regard to a steady ignition of the pressure gas-generating charge.

A more steady ignition of the pressure gas-generating charge could be achieved, if the ignition unit was arranged in the center of the charge, at both sides of the ignition unit, located therefore, in approximately the same quantity and distribution of gas-producing material. Such arrangements of the ignition units of gas generators are known from U.S. Pat. No. 4,437,681 and U.S. Pat. No. 4,561,675. According to the latter U.S. patent, the ignition unit is arranged transverse to the longitudinal extent of the gas generator in the center of its longitudinal extent, wherein the ignition unit is anchored or secured in the relatively thick housing wall. The problems of securing the ignition device in the wall of the outer tube of a tubular gas generator consists in that this connection cannot be formed to be sufficiently stable, since the outer tube, just like the inner tube, is relatively thin, therefore a secure support, which is acting reliably against the forces produced with ignition of the charge, is not able to be achieved.

SUMMARY OF THE INVENTION

An object of the invention is to create a gas generator of the afore-mentioned type in which an ignition device is arranged in a favorable position, relative to a steady ignition of the gas-producing material and anchored sufficiently and stably with both tubes.

In order to achieve this object, it is proposed in accordance with this invention that the ignition device is arranged in the central region of the axial extent of both tubes, that arranged in both tubes there are peripheral openings aligned with each other, through which the ignition device extends, transverse to the axial-extent of the tubes, and in that the annular intermediate chamber between the inner tube and the outer tube in the region of the peripheral openings is occupied by a substantially circular segment-shaped holding body, which has an installation through-hole for holding the ignition device, aligning with the peripheral openings.

According to the invention, the ignition device is held by a holding body, with which it is preferably threaded. The holding body has an installation through-hole, in which the ignition device is held in a form-locking manner. The ignition device extends, moreover, through peripheral openings in both tubes; these peripheral openings are formed, relative to the axial extent of the gas generator, in the central region of the tubular walls and align with each other. The holding body, which is formed substantially in an annular segment-shape, has a thickness which is equal to the radial spacing of both tubes relative to each other. Thereby the holding body occupies the intermediate chamber between both tubes in the region of its peripheral openings and around the openings. The holding body is laid like an insertion part between both tubes. If radial forces act on the ignition device when igniting the gas-producing charge, the device is supported by way of the holding body against the inner side of the outer tube, wherein, in the region of the edge of the peripheral opening in the outer tube, it rests against this tube. The holding body should be accommodated without radial play in the annular intermediate chamber. With the invention, therefore, a form-locking connection or secure fit of the ignition device in the cylindrical housing wall of the gas generator, consisting of both tubes, is created.

The condition that the holding body has a thickness which is as great as possible (at maximum equal to the radial spacing between both tubes), can still act advantageously relative to the strength and form-locking state of the connection to the ignition device. Since, because of the dimensions of the tubular gas generator, the ignition device has, in its section extending through the installation through-hole, an outer diameter, which is only a bit smaller than the outer diameter of the inner tube or, if one imagines the annular segment-shaped holding body as a closed ring, slightly smaller than the inner diameter of the holding body, the holding body has in its region surrounding the ignition device only a relatively low strength (thickness). Because of the cylindrical design of the gas generator housing, the holding body surrounds the ignition element namely only in its radially outward lying region adjacent to the outer tube. The complete depth of the installation through-hole in the holding body, because of the cylindrical form of the inner tube, cannot be exploited namely for connecting the ignition device and holding body. It is advantageous, if the inner tube is flattened in the region of its peripheral opening; in this way the ignition device can penetrate more deeply in the holding body and can thus be held there more securely.

Preferably the holding body is tubular, whereby it fills out the annular intermediate chamber over the whole periphery. Thus a further increase in the stability of the tubular gas generator is achieved. When the inner tube is expanded when igniting the pressure gas-generating charge, it presses the tubular holding body surrounding the inner tube against the inner side of the outer tube. The tubular holding body creates, therefore, a mechanical coupling between both tubes when there is pressure gas formation so that both tubes can act together against the radial forces and a bursting of the gas generator housing in its central region is prevented.

In order to be able to make the axial extent of the tubular holding body as small as possible, with constant stability of the connection between the ignition device and the holding body, it is proposed according to a further embodiment of the invention that the tubular holding body is slotted in the region diametrically opposite the installation through-hole, with a slot extending over the complete axial length of the tubular holding body. The holding body expands, because of the slot, with pressure load, as a result of the ignition of the pressure gas-producing material, whereby the weakest region of the holding body, namely the region around the installation through-hole upto the axial ends of the holding body is relieved and in this region a tearing of the holding body is avoided.

Furthermore through the expansion of the holding body the result is that the holding body is "compressed" in the installation through-hole region, and a ripping of the holding body in this critical region is thereby counteracted. The slot has, therefore, the advantage that the regions of the holding body adjoining to the installation through-hole in the axial extent of the gas generator, can be formed to be relatively short, and the holding body only slightly extends therefore in the axial direction at both sides over and beyond the peripheral openings in both tubes. The extent is in each case required in order to create a sufficient supporting surface for the holding body against the outer tube.

The peripheral openings preferably surround the ignition device laterally. In this way the openings ensure that the ignition device together with the holding body in the axial direction can still move in the peripheral direction, and is therefore fixed.

Preferably the ignition device in the installation through-hole is threaded with the holding body. For this purpose the installation through-hole has an internal thread and the ignition device a corresponding external thread.

According to an advantageous further embodiment of the invention the ignition device has an ignition unit and a carrier body, on which the ignition unit is secured and which, for its part, is held by the holding body. The carrier body, which preferably has a cylindrical outer contour, carries the actual ignition unit, which is arranged in the axial direction projecting away from the carrier body and extending just into the inner tube.

The peripheral opening in the outer tube preferably surrounds the carrier body, which has, for its part, a shoulder projection which rests by way of a sealing element on the inner tube. The sealing element held in a clamping manner reliably seals the "pressure gas-generating chamber". As long as a sealing element is provided, it is advantageous to create on the inner tube a level bearing surface for the sealing element. This is advantageously achieved by a flattening (an inwardly directed stamping or pressing flat) of the inner tube in the region of its peripheral opening. The flattening can, however, also be created in that the outer surface of the inner tube is flattened in regions. The ignition unit is sealed relative to the carrier body preferably with adhesive.

BRIEF DESCRIPTION OF THE DRAWINGS

An embodiment of the invention is described in detail with reference to the accompanying drawings wherein.

DETAILED DESCRIPTION OF THE INVENTION

Figure 1:
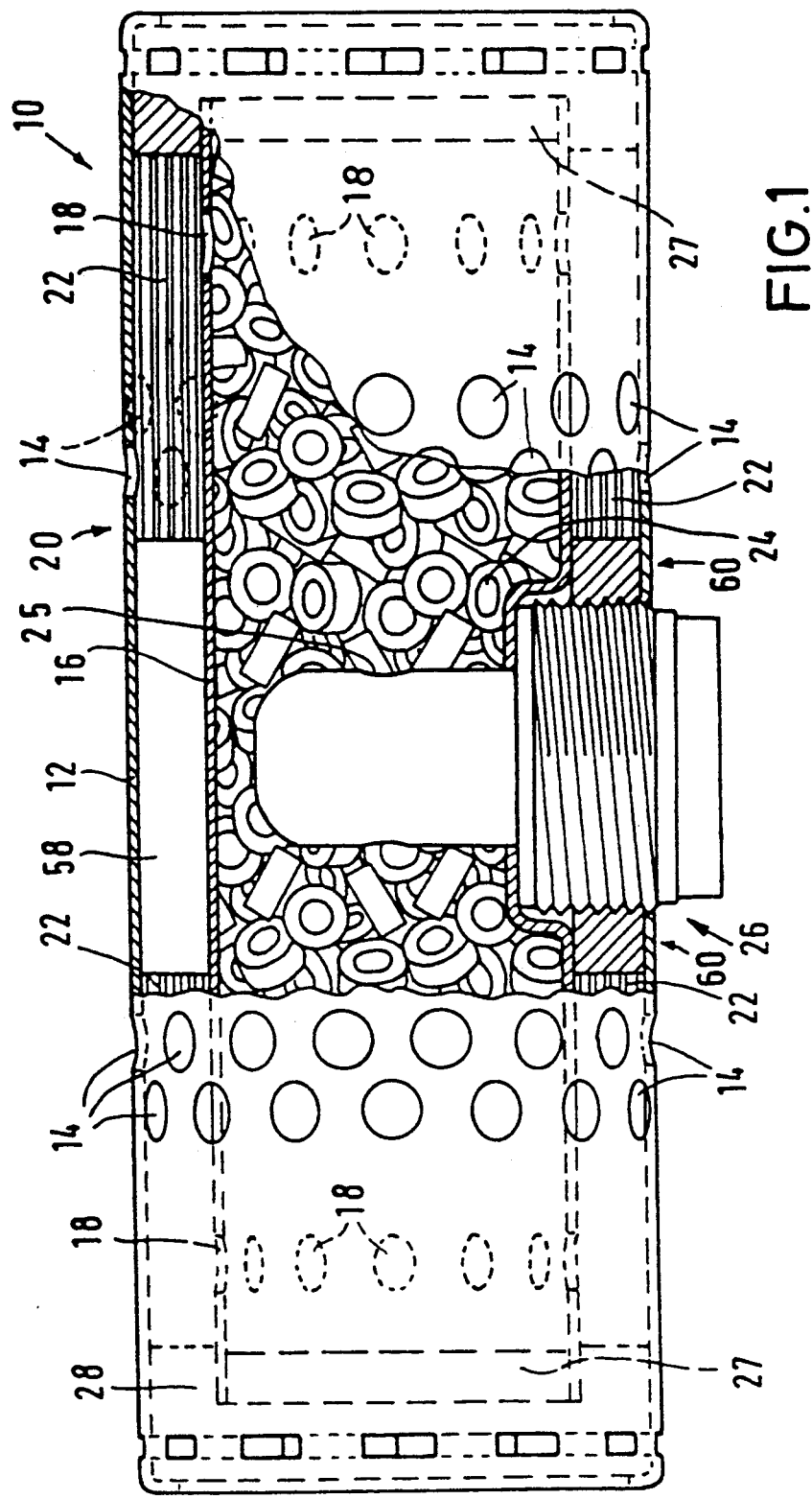
FIG. 1 shows a side view of a gas generator, partially in section, with a central region being illustrated in longitudinal section.

In FIG. 1 there is shown a tubular gas generator 10, especially suitable for a motor vehicle air bag. The tubular gas generator 10 has a metal outer tube 12, in the jacket of which there are formed several gas outlet openings 14. The gas outlet openings 14 are evenly distributed along four peripheral rows in the outer tube 12. The gas outlet openings 14 are located substantially in the central section or region of the outer tube 12. Within the outer tube 12 there is accommodated an inner tube 16 of metal arranged coaxially. In the axial end sections of the cylindrical wall of the inner tube 16, there are also formed gas outlet openings 18, these gas outlet openings 18 being distributed evenly over two peripheral rows in a region of the end sections of the inner tube 16. Between the gas outlet openings 14 of the outer tube 12 and the gas outlet openings 18 of the inner tube 16 there is therefore an axial spacing.

The outer diameter of the inner tube 16 is smaller than the inner diameter of the outer tube 12, so that between the outer tube and the inner tube there is an annular intermediate chamber 20. This annular intermediate chamber is filled up in a region extending between the gas outlet openings 14, 18 of both tubes 12, 16 with metal filter packs 22 (highgrade steel wire netting mats).

The inner tube 16 is filled up with gas-producing material based on sodium azide, which during combustion produces a pressure gas. The gas-producing material, also called "pressure gas-generating charge", is present in the form of so-called pellets 24, which are accommodated disordered by or randomly in the inner tube 16. An electrically actuated ignition device 26 for igniting the pressure gas-generating charge is secured to both tubes 12, 16 and extends through an opening in the inner tube 16 partially into the tube 16.

The gas generator 10 is closed on the front ends of the outer tube 12 by disc-like closure covers 28. At the ends of the inner tube 16 there are spring-elastic, compressible disc elements 27 of ceramic felt or ceramic fabric, which extend over the whole inner cross-sectional surface of the inner tube 16, and are supported, on the one hand, against the pellets 24 and, on the other hand, against the closure covers 28, whereby elements 27 hold the pellets 24 together with spring force. The metal closure covers 28 hold and also position the inner tube 16.

In the following description, the operation of the gas generator 10 shown in FIG. 1 is described. The electrically actuated ignition device 26, which, in this embodiment, is a so-called layer bridge igniter with primer material, is ignited by a defined electric pulse. On use of the tubular gas generator according to FIG. 1 as a pressure gas generator in an air bag, this electric pulse, for example, is applied to the ignition unit 26 by closing an inertia switch, in the event of collision of the motor vehicle with another object. In the ignition device 26, a so-called booster charge is ignited; the ignition vapors produced in this process (flames, gas, hot combustion products) arrive, via openings 25 provided in the ignition device 26, in the inner chamber of the inner tube 16, where the ignition vapors ignite the (propellant charge) - pellets 24 on each side evenly and at the same time. In the inner tube 16, depending on the configuration, a varying quantity of gas-producing material is converted into gas with a pressure of approximately 200 bar. The hot gases, which consist of approximately 95% nitrogen, arrive via the gas outlet openings 18 at the ends of the inner tube 16, and from this, arrive at the filter packs 22. The filter packs 22 have the object of cooling the gases and cleaning and removing particles (solid matter) and condensates. The gases cooled and cleaned in this manner exit via the gas outlet openings 14 in the outer tube 12. The tubular gas generator 10 described here produces in a time of approximately 30 milliseconds in a test volume of 60 dm$^3$ a gas pressure of approximately 3 bar.

Figure 2:
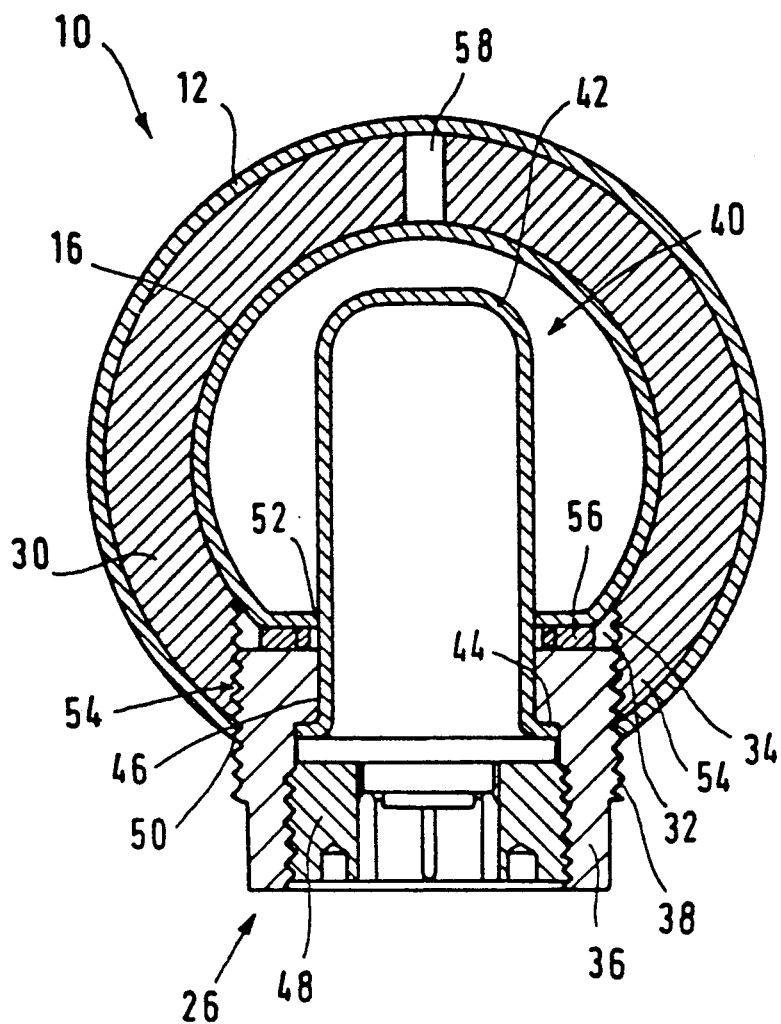
FIG. 2 shows—in an enlarged scale—a cross-section through the central region of the gas generator according to FIG. 1.

As can be seen from FIGS. 1 and 2, the ignition device 26 is held by an annular or tubular holding body 30. The holding body 30 is arranged concentrically to both tubes 12, 16 and has a thickness which is equal to the radial spacing of both tubes 12, 16 from each other. The holding body 30 fills out therefore the whole annular intermediate region in the central portion of the gas generator. According to FIG. 1 the holding body is arranged between the two filter packs 22, wherein it rests on its front sides on the front side ends of the filter packs 22 facing each other.

The holding body 30 has, according to FIG. 2, an installation through-hole 32, which extends axially through the holding body 30. The through-hole 32 is provided with an internal thread indicated by reference numeral 34 and serves to accept a substantially cylindrical carrier body 36, which has an external thread, indicated by reference numeral 38. The carrier body 36 is part of the ignition device 26 and carries an ignition unit 40 with a substantially cylindrical housing 42, closed at one end. A further substantially cylindrical housing 67 with a flange 62—shown in a side view—continuing an electrical igniter element, an igniter charge etc. as well known in the art is inserted in the housing 62. The other end of the cylindrical housing 42 has an outer annular flange 44. The housing 42 extends through a central bore 46 in the carrier body 36, whereby the outer annular flange 44 rests against an annular offset in the through-bore 46. A threaded stopper 48 is screwed into the through-bore 46, provided with an internal thread in its region facing away from both tubes 12, 16, which stopper holds the annular flanges 44 and 62 clamped between itself and the annular offset and thus the housing 42 of the ignition unit 40 is secured in the carrier body 36. For sealing the housing 42 relative to the carrier body 36 the annular flange 44 is adhered to the carrier body 36.

The ignition device 26 formed as described above, the length extent of which is directed transverse to the longitudinal extent of the gas generator 10, extends through two peripheral openings 50, 52 in both tubes 12, 16. Both these peripheral openings 50, 52 align with each other and are aligned coaxially to each other, but have different diameters, since the peripheral passage 50 in the outer tube 12 surrounds the ignition device 26 in the region of its carrier body 36, which has a greater diameter, than the housing 42 of the ignition unit, which is surrounded by the peripheral opening 52 in the inner tube 16. A securing of the ignition device 26 does not occur by way of the peripheral openings 50, 52 on both tubes 12, 16. Rather the carrier body 36 of the ignition device 26 is connected to the holding body 30 in a form-locking manner by a threaded connection. The radially outwardly directed forces acting on the housing 42 of the ignition unit 40 are absorbed, with pressure buildup of the gas, by way of the threaded stopper 48 and the carrier body 36, by the holding body 30, which is pressed against the inner side of the outer tube 12. This pressure also occurs, however, because of the expansion of the inner tube 16. Both tubes are coupled mechanically to each other by way of the holding body 30 filling up the intermediate chamber 20.

As can be seen clearly from FIG. 2, the region, in which the internal thread 34 of the installation through-hole 32 interlocks with the external thread 38 of the carrier body 36, is relatively narrow. This is because the diameter of the installation through-hole 32 is only slightly smaller than the outer diameter of the inner tube 16 or the inner diameter of the holding body 30 and the carrier body 26, because of the cylindrical form of the inner tube 16, cannot plunge or extend excessively deeply into the installation through-hole 32. The condition mentioned first has, moreover, the result that the region 54 of the holding body 30 connecting in the peripheral direction to the installation through-hole 32 is relatively thin. In this region the full strength of the holding body 30 cannot be exploited. In order to achieve with a cylindrical carrier body 36 a sufficient meshing of the internal thread 34 with the external thread 36, the inner tube 16 has a flattened wall portion in the region of its peripheral opening 52. The flattened portion is formed by an impression of the inner tube 16. The pleat-like flattening of the inner tube 16 enables the carrier body 36 to plunge further into the installation through-hole 32. On its annular front surface, facing the inner tube 16, the carrier body 36 is provided with a packing annular material 56 surrounding the housing 42, which is held clamped between the carrier body 36 and the flattened portion of the inner tube 16.

In its region which is diametrically opposite the installation through-hole 32, the holding body 30 is provided with a slot or a gap 58, which extends radially and axially through the holding body. The slot 58 facilitates an expansion of the holding body 30 when there is pressure gas formation and relieves this pressure therefore in the region around the installation through-hole 32. The regions 60 (see FIG. 1) connecting, in the axial direction of the holding body 30, to the installation through-hole 32, are particularly protected against tearing or bursting by the possibility of expansion of the holding body 30.

What is claimed is:
1. A tubular gas generator for an air bag comprising an outer tube;
an inner tube for accepting gas-producing material, said inner tube forming an annular intermediate chamber and being arranged within and radially spaced from the outer tube;
closure covers for closing open front ends of both the outer and the inner tubes; and
an ignition device for igniting the gas-producing material; the ignition device being arranged in a central region of the axial extent of the outer and inner tubes; peripheral opening arranged in both tubes, said peripheral openings being aligned with each other, said ignition device extending through the aligned peripheral openings; and the intermediate chamber between the inner tube and the outer tuber being occupied in the region of the peripheral openings by a substantially annular segment-shaped holding body which has an installation through-hole aligning with the peripheral openings for holding the ignition device; said holding body being tubular shaped and occupying the annular intermediate chamber over substantially its whole periphery, the tubular holding body having a slot extending over its whole axial length, and said slot being arranged diametrically opposite the installation through-hole of said body.

2. A gas generator according to claim 1, wherein both the outer and the inner tubes and the holding body are arranged coaxially to each other.

3. A gas generator according to claim 1, wherein the holding body extends in the axial direction over and beyond the peripheral openings in the outer and inner tubes.

4. A gas generator according to claim 3, wherein the peripheral openings surround the ignition device laterally.

5. A gas generator according to claim 1, wherein the installation through-hole has an internal thread and the ignition device has a corresponding external thread.

6. A gas generator according to claim 1, wherein the ignition device has an ignition unit arranged in a housing, wherein the housing is secured to a carrier body and which is held by the holding body.

7. A gas generator according to claim 6, wherein a peripheral opening surrounds the carrier body in the outer tube, and the carrier body has a shoulder projection, which rests in a sealing manner by way of a sealing element on an edge region of the peripheral opening of the inner tube.

8. A gas generator according to claim 1, wherein an outer peripheral portion of the inner tube is flattened and level in one region and the peripheral opening of the inner tube is arranged in this flattened portion.

9. A gas generator according to claim 1, wherein said outer tube comprises a tube having a plurality of gas outlet openings arranged selectively in a central region of the outer tube and said inner tube comprises a tube having a plurality of gas outlet openings arranged selectively in axial end sections of the inner tube, the gas outlet openings in the outer tube being axially spaced from the gas outlet openings in the inner tube.

10. A gas generator according to claim 9, wherein the intermediate chamber is filled in a region extending between the gas outlet openings in the inner tube and the gas outlet openings in the outer tube with filter material.

11. A gas generator according to claim 1, wherein the outer tube and the inner tube are arranged concentric to each other and have a common longitudinal axis, said ignition device being arranged to extend perpendicular to said axis.

12. A gas generator according to claim 11, wherein the inner tube and the outer tube are metal tubes.

* * * * *